United States Patent

Foss et al.

[11] Patent Number: 5,392,950
[45] Date of Patent: Feb. 28, 1995

[54] PLASTIC CONTAINER WITH A COMPLETELY SEALED HANDLE

[75] Inventors: Kevin A. Foss, Bartlett; Theodore Guss, Crystal Lake; Darin R. Paul, Mount Prospect; Robert E. Sherwood, Des Plaines, all of Ill.

[73] Assignee: Continental Plastic Containers, Inc., Norwalk, Conn.

[21] Appl. No.: 49,812

[22] Filed: Apr. 20, 1993

[51] Int. Cl.⁶ .............................................. B65D 23/00
[52] U.S. Cl. ........................................ 220/771; 215/1 C; 264/531; 264/535
[58] Field of Search ................... 220/771; 215/1 C; 264/531, 534

[56] References Cited

U.S. PATENT DOCUMENTS

| | | | |
|---|---|---|---|
| 3,342,916 | 9/1967 | Peters | 264/98 |
| 3,362,043 | 1/1968 | Langdon et al. | 18/5 |
| 3,366,290 | 1/1968 | Mojonnier et al. | 215/1 C |
| 3,369,690 | 2/1968 | Hayes | 220/771 X |
| 3,400,846 | 9/1968 | Kelly | 215/1 C |
| 3,444,285 | 5/1969 | Mason | 264/89 |
| 3,746,200 | 7/1973 | Flider | 215/1 C X |
| 3,892,828 | 7/1975 | Weatherly et al. | 264/89 |
| 3,944,642 | 3/1976 | Uhlig | 264/89 |
| 3,983,199 | 9/1976 | Uhlig | 264/531 X |
| 4,799,129 | 4/1980 | Fischer | 264/534 X |
| 4,969,571 | 11/1990 | Bartz | 220/771 |
| 4,988,279 | 1/1991 | Belcher | 425/525 |
| 5,232,107 | 8/1993 | Krall et al. | 220/771 X |
| 5,275,780 | 1/1994 | Robinson | 220/771 X |

*Primary Examiner*—Steven M. Pollard
*Attorney, Agent, or Firm*—Eugene F. Friedman

[57] ABSTRACT

A plastic container for holding liquids, such as syrup, which has a hollow handle completely sealed from the bottle's exterior and interior. The bottle results from blow molding an extruded thermoplastic parison into an unfinished bottle which has a channel running between the interior of the bottle and the hollow space defined by the handle. The air pressure to form the handle passes through this channel. Sealing this channel through the application of ultrasonic heat closes it and provides a handle with an interior volume completely shut off from the exterior and from the inside of the bottle.

39 Claims, 5 Drawing Sheets

Fig. 4
Fig. 5
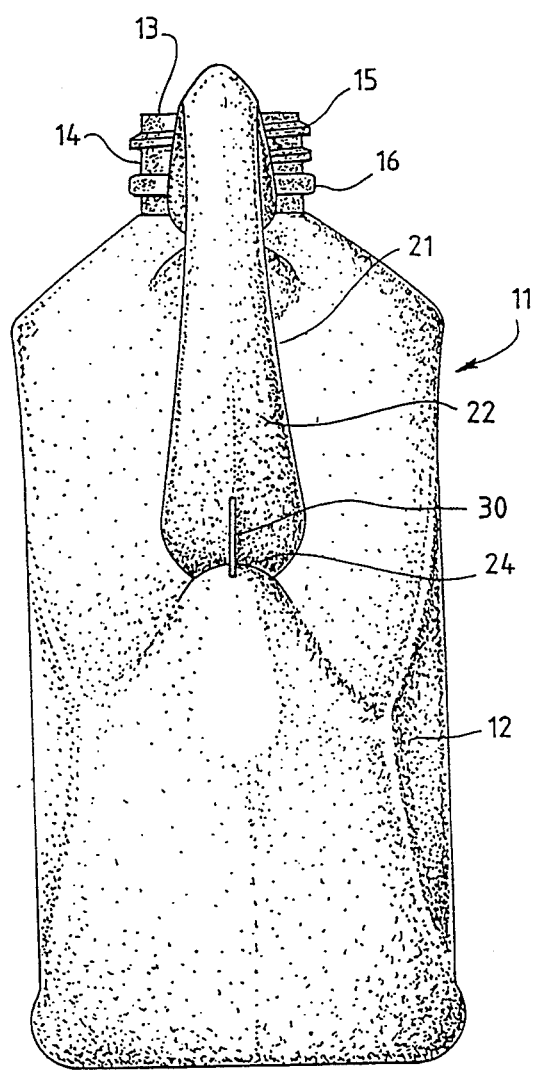
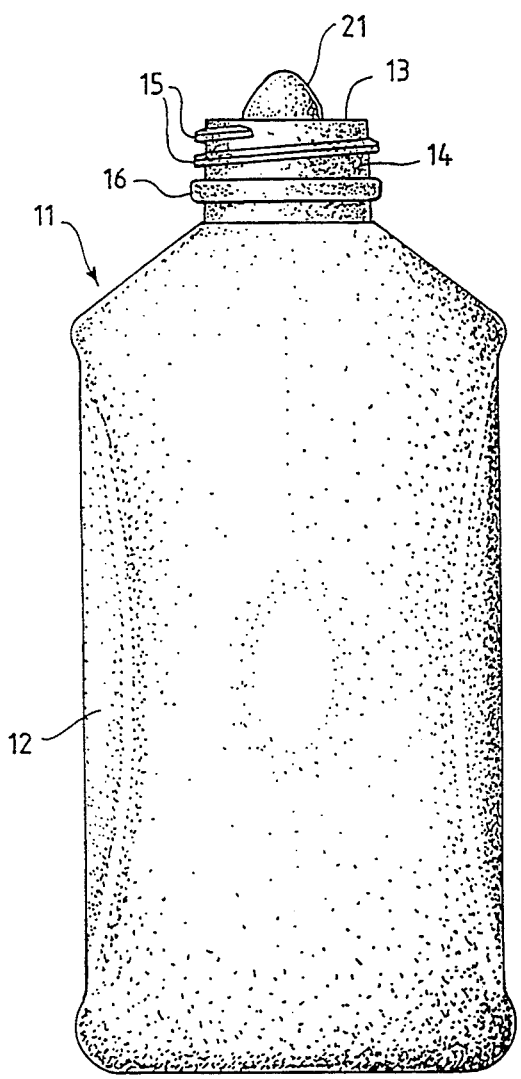

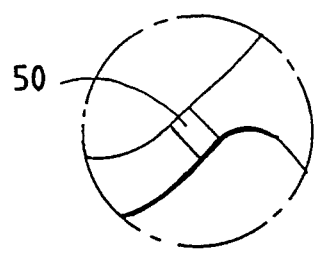
Fig. 7A
Fig. 8
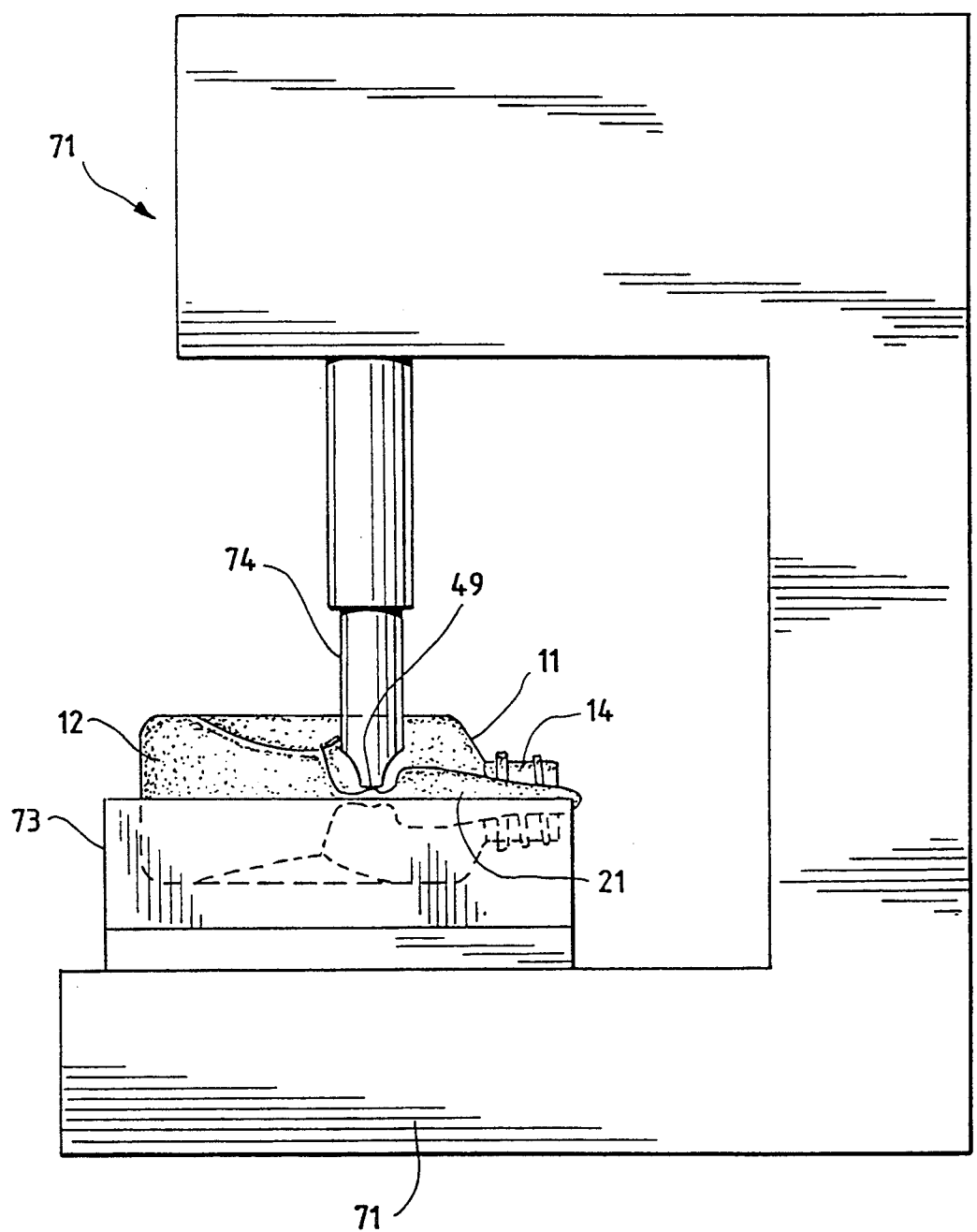

PLASTIC CONTAINER WITH A COMPLETELY SEALED HANDLE

BACKGROUND

Many plastic bottles currently finding use in the marketplace employ integral hollow handles to permit the customer to facilely hold them. A common type of handle assumes the form of a hollow tube formed integrally with the body of the container. The handle itself is hollow and retains fluid communication with the interior of the bottle. Thus, this type of handle itself accommodates some small portion of the goods contained in the bottle.

The type of handle which will contain some of the goods of the bottle has not always proved desirable. This represents the situation especially where the bottle contains ingredients, especially in liquid form, that may spoil. Thus, the goods in the handle may not entirely drain into the remainder of the bottle. Rather they remain in their original location and may undergo spoilage and contaminate the remainder of the bottle's contents.

Another type of handle also is hollow but has no direct fluid communication with the bottle's interior. Thus, the handle receives no contents and accordingly cannot contribute to the spoilage of the bottle's contents. Yet, the handle must become hollow during formation so that it may support the bottle and avoid sharp edges which could injure the user's hand. With no fluid communication to the interior of the bottle, this type of handle will receive its air pressure, during the molding of the bottle, directly from the mold. It does this through a needle having access to the handle's interior.

However, upon completion, the handle has a small opening to the exterior where the needle had entered to provide the air pressure. Liquids and other materials may enter the handle through this opening and spoil. Furthermore, the user of this type of bottle may wish to heat its contents through the use of a microwave oven. Should any liquid enter the handle through the small opening, it would become heated in the oven. When the consumer attempts to grab the handle, the heat from the liquid could cause the handle to become sufficiently hot to burn her. Accordingly, the search continues to provide molded bottles having more desirable handles.

U.S. Pat. No. 5,087,406 to Krall et al. shows the molding of a container having a hollow handle. The handle receives its air through a channel passing directly to the moil, or flash. However, it does not suggest how to avoid having an opening in the handle upon the removal of the flash.

In comparison, D. L. Peters, in his U.S. Pat. No. 3,342,916, provides a blow molded, hollow jar top with an integral, hollow handle. The interior of the handle communicates with the interior of the top. Peters blow molds the article through an air hole located in the flash attached to the handle and having air channels leading to it. He does not suggest, however, an enclosed hollow handle completely separate from the remainder of the article. Again, in Peters, the removal of the flash results in the handle having holes which permit fluid communication between the interior of the handle and the exterior of the article.

SUMMARY

Providing a container having a totally enclosed handle completely separated from the container's interior overcomes the shortcomings of the previous molded bottles. None of the contents can remain in the handle to cause spoilage. No foreign substance can enter the bottle from the exterior to cause unattractive and unappetizing spoilage. Furthermore, eliminating the possibility of the entrance of liquids into the handle from the exterior limits the amount of heat the handle can absorb from a microwave oven. Thus it will remain cool even during microwaving and permit a user to hold it without burning her hand.

Specifically, a container composed of a thermoplastic material typically includes a body with an opening and a neck coupled to the opening. An improved container results when it includes a hollow handle composed of the thermoplastic material and attached to the body. The volume enclosed by the handle should remain completely enclosed and, in particular, separated by the thermoplastic material from both the container's interior and the exterior. This structure results in the hollow interior of the handle remaining completely isolated during use from the handle's surroundings and the container's interior.

An article finding use in forming this type of container may have substantially the same structure. However, an air channel may exist between the interior of the container's body and the volume enclosed by the hollow handle. This channel permits the blow molding of the article through pressure applied directly only to the container's interior. The production of the final container, after the initial molding of this article, involves closing this channel between the interior of the body and the handle's enclosed volume. Generally, this proceeds through the application of heat to the thermoplastic defining the channel so that it may melt and seal it. Ultrasonic welding has proved a facile method of providing this heat.

BRIEF DESCRIPTION OF THE FIGURES

FIG. 4 gives a right side elevational view of the container of FIG. 1.

FIG. 5 gives a left side elevational of the container of FIG. 1.

FIG. 7A gives an enlarged view of the groove in the mold of FIG. 7 providing the open channel leading between the interior of the container's body and the interior space of the handle.

FIG. 8 gives a diagrammatic view of an ultrasonic welder used to close the channel connecting the interior of the handle with the interior of the container's body of FIGS. 1 through 5.

DETAILED DESCRIPTION

Figure 1:
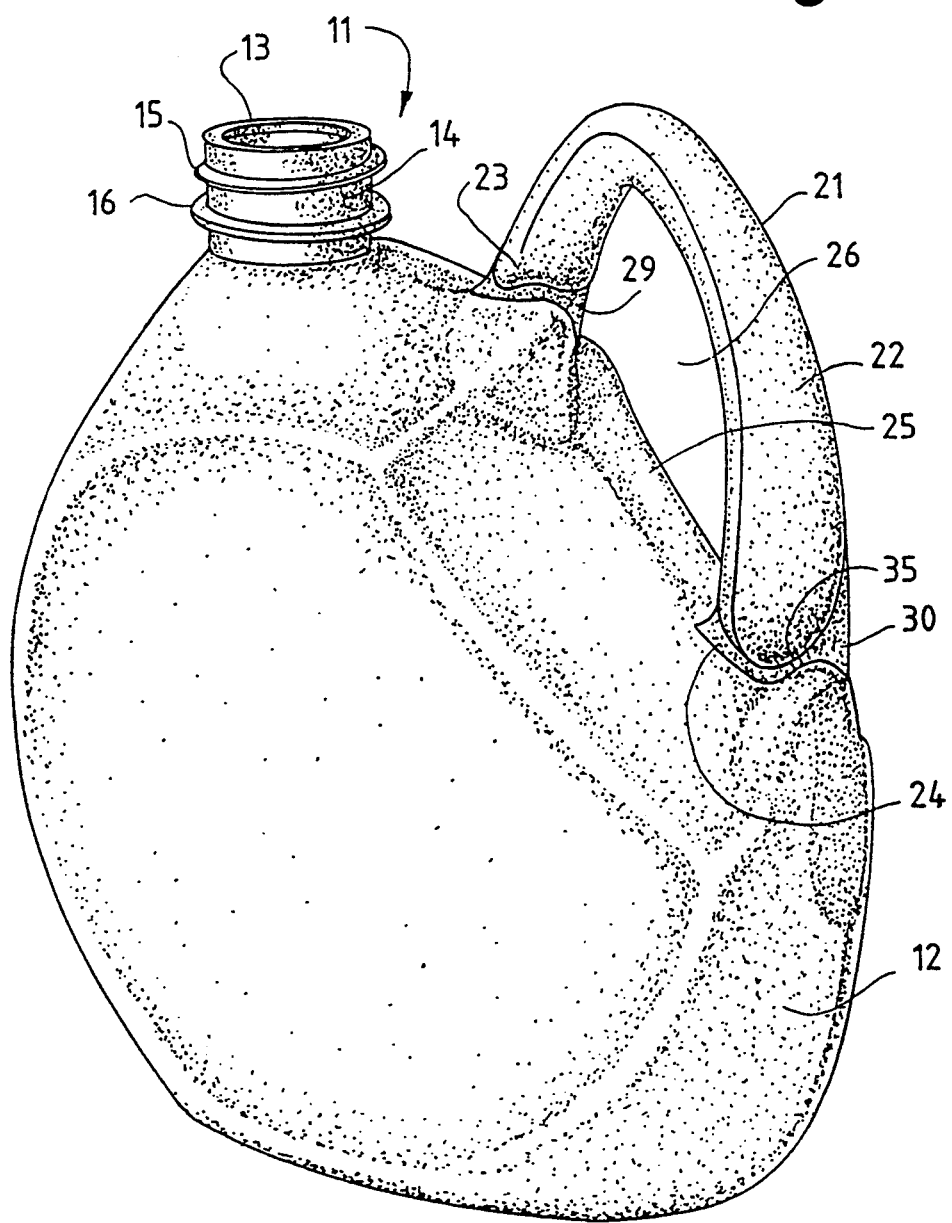
FIG. 1 provides a perspective view of a container having a handle with an enclosed volume completely separate from both the interior of the container and the exterior of the handle.

As seen in FIGS. 1 to 5, the container indicated generally at 11 includes the body 12 with the opening 13 through which liquid or powder ingredients may pass into or out of the container 11. The neck 14 attaches to the body 12 at the opening 13 and includes the screw threads 15 for the attachment of the cap. The ridge 16 aids in the final polishing of the neck 14. It also provides a surface to which a tamper-proof feature may attach during the placement of a cap on the neck 14.

The container 11 also includes the handle 21 with the hollow interior 22. The handle 21 attaches to the body 12 at the two locations 23 and 24. Between the two attachments 23 and 24, the bottle surface 25 does not touch the handle 21. This leaves the open area 26 into which the user may place her hand in order to lift the container 11.

Figure 2:
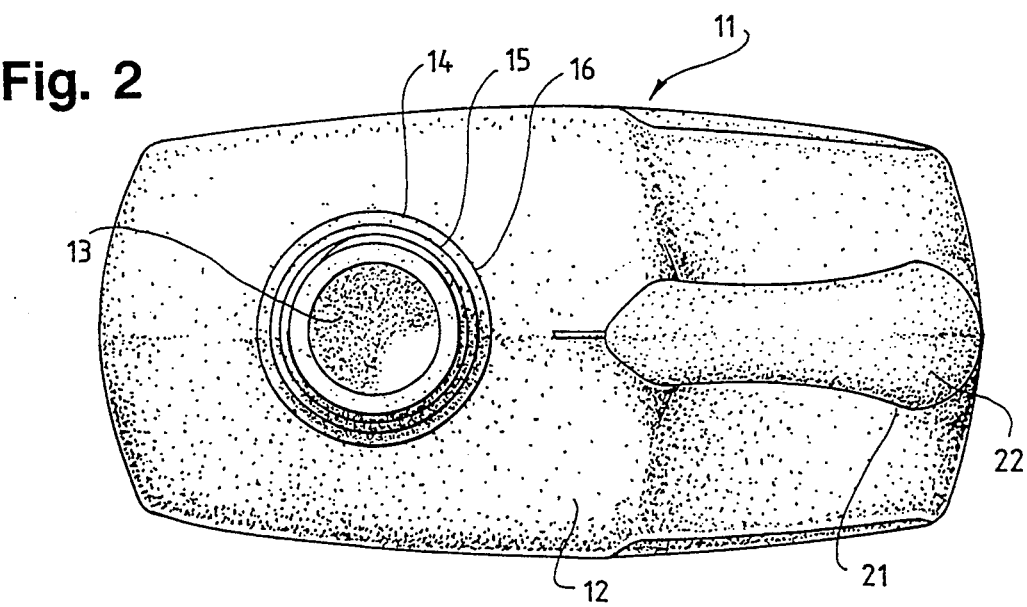
FIG. 2 provides a front elevational view of the container of FIG. 1.
Figure 3:
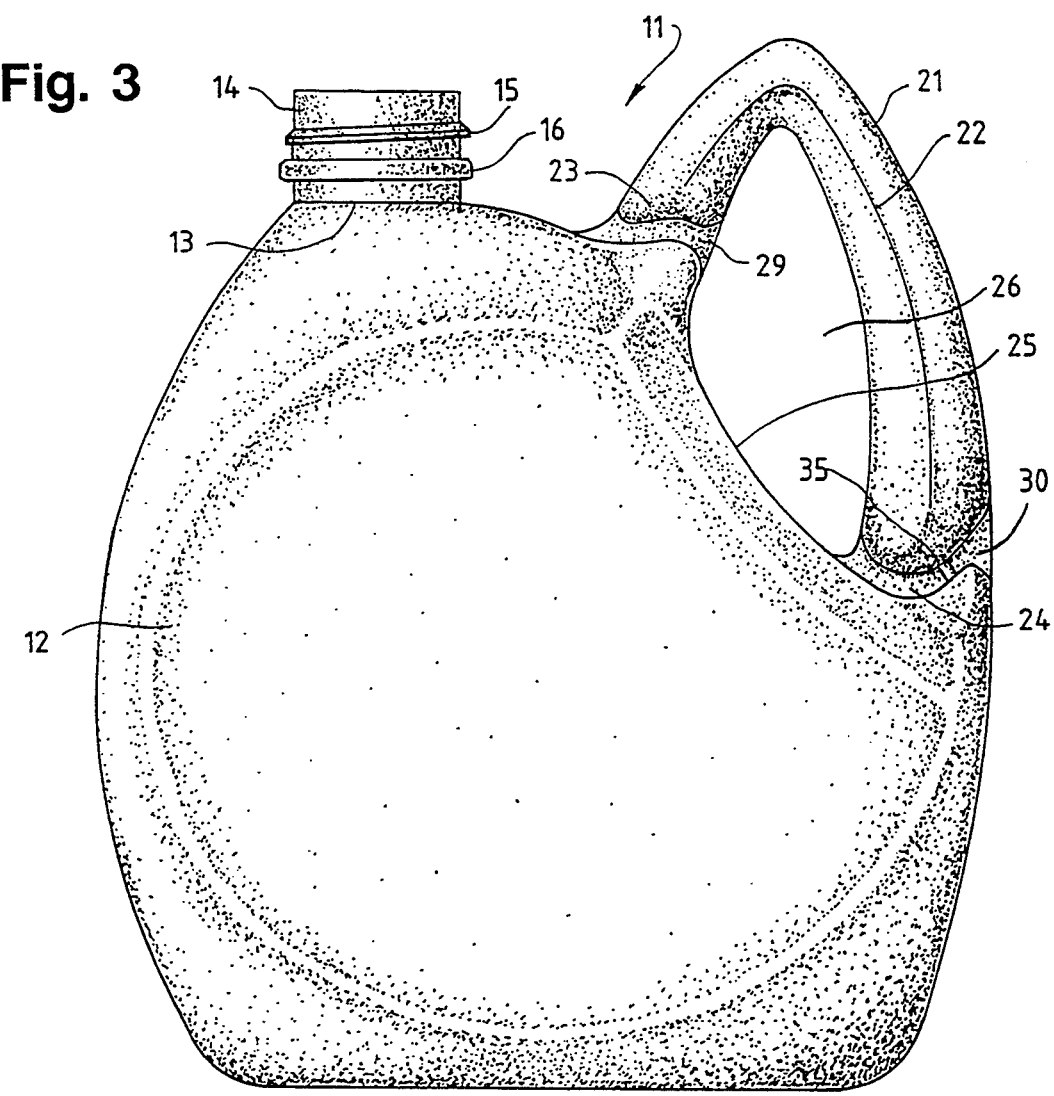
FIG. 3 gives a top plan view of the container of FIG. 1.

As seen most clearly in FIG. 2, the attachment point 23 includes the flat curved section 29. The flatness of this section results in no channel passing between the handle 21 and the body 12. This seals the two portions of the container 11 from each other. On the other hand, the curved, "S" shape of the flat section 29 gives it rigidity against bending into or out of the plane of the drawing of FIG. 2. Similarly, at the other end of the handle, the flat, curved section 30 separates the handle 21 from the body 12. Again, the flatness prevents the existence of an air channel between the body 12 and the handle 12. The flat section 30 again takes the shape of a curve to prevent flexing of the handle 21 into or out of the plane of the drawing.

As seen in FIGS. 1 and 2, the closed channel 35 lies between the handle 21 and the body 12. As discussed below, this closed channel 35, when previously open, had permitted the passage of air from the container body 12 into the handle 21 during blow molding to create the enclosed interior volume 22.

Figure 6:
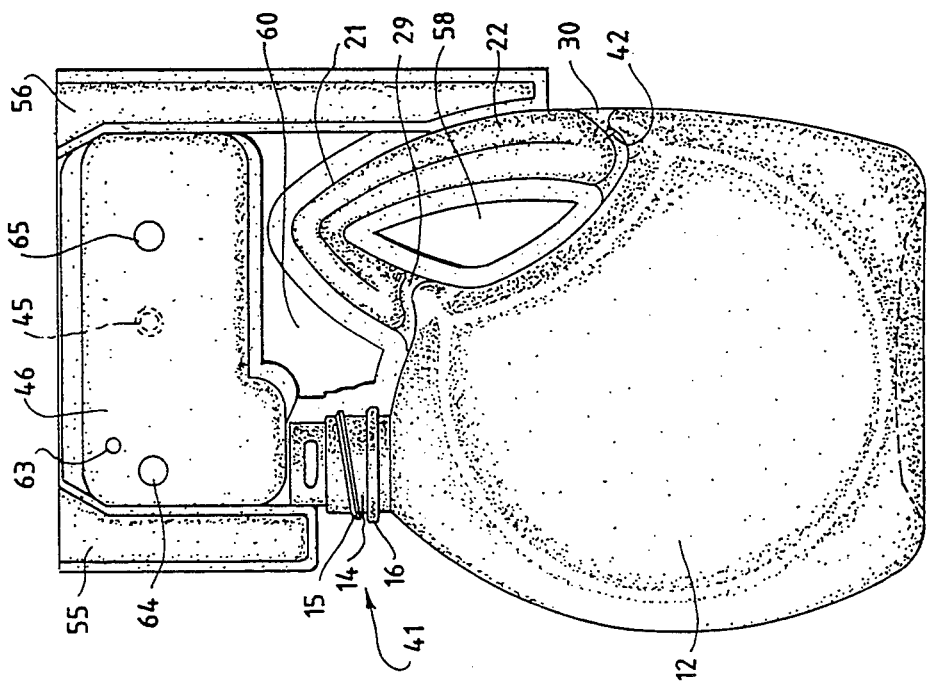
FIG. 6 gives a front elevational view of the container of FIGS. 1 through 5 after its molding but prior to the removal of the flash associated with it and prior to the closing of the channel between the handle's interior and the interior of the container's body.

The incomplete container, after its molding, but prior to the removal of flash and the sealing of the closed channel 35 appears generally at 41 in FIG. 6. Upon its initial molding, the channel 42 remains open. During the initial molding of the incomplete container 41 in the mold 43 shown in FIG. 7, the open channel 42 permitted the passage of air pressure from the container body into the interior 22 of the handle 21.

Figure 7:
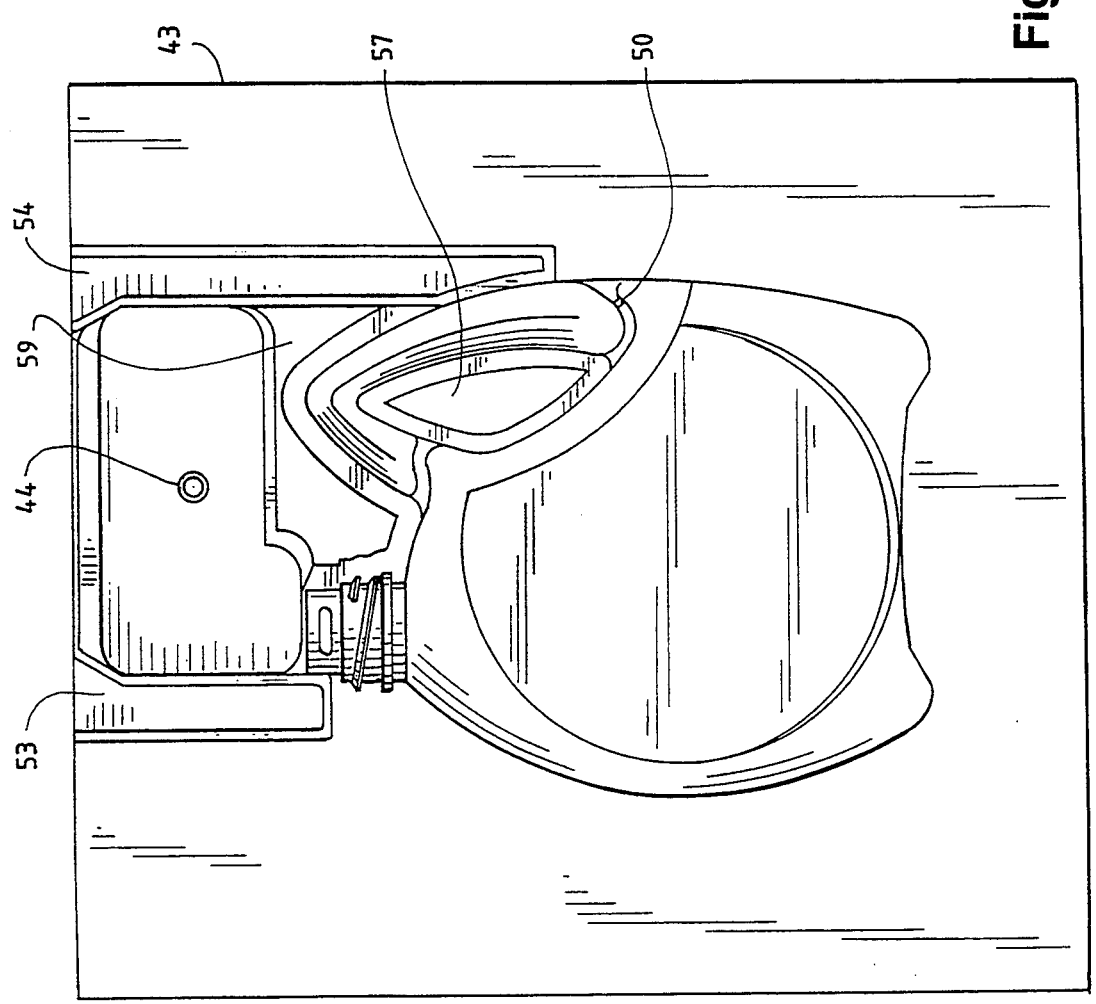
FIG. 7 gives a front elevational view of one half of a mold to provide the container seen in FIG. 6 with its flashing.

To form the incomplete molded product 41 of FIG. 6, a closed, tubular, molten, thermoplastic parison enters the mold of which the half 43 appears in FIG. 7. A light air pressure sits within the interior of the parison to keep it from collapsing upon itself in the molten state. The mold half 43 along with its substantially bilaterally symmetric mate closes around the parison which has a width about that of the cavity itself. Upon closure, the high pressure enters through the air injector 44 of the mold half 43. From there, the air pressure passes through the air hole 45 in FIG. 6, into the flow pocket 46, and through the neck 14 into the body 12. Air pressure from the body 12 then passes through the open channel 42 to enter the interior 22 of the handle 21 so that the latter, under the pressure, conforms to the configuration of the mold.

The open channel 42 results from the groove 50 cut into the mold 43. This appears more clearly in the partial, expanded view of FIG. 7A.

The correspondence between the parts of the mold 43 and that of the incomplete molded container of 41 of FIG. 6 appears from a review of those figures. Thus, the flash pockets 53 and 54 give rise to the sections of flash 55 and 56, respectively. The pocket 57 produces the handle slug 58 in the molded product 41 of FIG. 6. The pocket 59 results in the flash 60. The flash, after removal and regrinding, may constitute part of the plastic for further containers.

Additional features in the molded product 41 of FIG. 6 not appearing from the mold half 43 results from minor differences in the half of the mold not shown in FIG. 7. Thus, the blow pocket 46 includes the rupture vent 63 which allows for the escape of excess air pressure upon the completion of the molding of the product 41. The knock-out pin counterbores 64 and 65 constitute minor projections for the knock-out pins on the mold to remove the product 41 after its molding.

Most any thermoplastic otherwise suitable may find use for molding the incomplete container 41 of FIG. 6. A convenient material when the resulting container will hold syrup may take the form of polypropylene. This includes Rexene 23B2 CS-220 or 23B2A CS-226 sold by the Rexene Corporation of Odessa, Tex., or Solvay 4104 or 4176 sold by Solvay Polymers, Inc. of Houston, Tex.

Preparing the bottle 11 from the molded product 41 involves, of course, removing the various sections of flash 55, 56, 58, and 60 and the blow pocket 46. In most areas, the mold 43 squeezes the plastic along the edge of the bottle so that the excess may undergo facile removal. However, the additional plastic attached to the neck 14 must be cut off and the neck 14 itself receive normal shaping. The solid connection between the neck 14 and the blow pocket 46 is necessary to provide a fluid-tight connection for the passage of air pressure into the body 12 and the handle 21.

Lastly, the open channel 42 between the body 12 and the handle 21 must undergo closure in order to complete the production of the container 11 of FIG. 1. The ultrasonic welder shown generally at 71 in FIG. 8 accomplishes this task. It may take the form of a 20 kHz., heavy duty, 2000 Watt system from the Dukane Corporation of St. Charles, Ill. The welder 71 includes the base 72 on which sits the bottle support 73. The bottle 11 then sits in the support 73.

To seal the channel 42 in the container 11, the welder 71 includes a 20A2000, 2000 Watt generator, a 43A250 thruster, a 43A270 heavy-duty press support, and a 43A100 ultra-com controller/monitor. The tooling 74 includes a 15696 horn which has a knife with a 1/16 inch flat section. Utilizing 40 lbs./in., the tooling 74 has a mechanical stop of 0.020 inch so that it does not cut through the flat area 30 between the body 12 and the handle 21 as seen in FIG. 1. Although it takes approximately 0.04 second to weld the open channel 42 into the closed channel 35, the knife 74 remains in position for approximately 0.25 second to accomplish this task.

Accordingly, what is claimed is:

1. In a container composed of a thermoplastic material and including (a) a body with an opening in said body and (b) a neck coupled to said opening, the improvement comprising a hollow handle composed of said thermoplastic material and attached to said body, the exterior of said handle being substantially seamless and smooth, the volume enclosed by said handle being completely enclosed and separated by said thermoplastic material from the interior of said container and the exterior of said container.

2. The improvement of claim 1 wherein said handle is integral with said body.

3. The improvement of claim 2 wherein said handle has an elongated shape.

4. The improvement of claim 3 wherein said handle has two attachments at separate locations to said body and is detached from said body between said locations.

5. The improvement of claim 4 wherein said neck is integral with said body.

6. The improvement of claim 4 wherein said thermoplastic material is polypropylene.

7. The improvement of claim 4 wherein each of said two attachments has a flat, curved configuration.

8. In an article composed of a thermoplastic material and used to form a container, said article including (a) a body with an opening in said body and (b) a neck coupled to said opening, the improvement comprising a hollow handle composed of said thermoplastic material and attached to said body, the volume enclosed by said handle being in fluid communication with the interior of said body through a channel formed in said thermoplastic material and passing between said interior of said body and said volume, said channel having a substantially smaller cross section than the cross section of said handle, said volume being separated by said thermoplastic material from direct communication with the exterior of said container.

9. The improvement of claim 8 wherein said handle is integral with said body.

10. The improvement of claim 9 wherein said handle has an elongated shape.

11. The improvement of claim 10 wherein said handle has two attachments at separate locations to said body and is detached from said body between said locations.

12. The improvement of claim 11 wherein said neck is integral with said body.

13. The improvement of claim 11 wherein said thermoplastic material is polypropylene.

14. The improvement of claim 11 wherein each of said two attachments has a flat, curved configuration.

15. A method of forming a container comprising:
(A) molding an article from a thermoplastic material, said article including (a) a body with an opening in said body, (b) a neck coupled to said opening, and (c) a hollow handle composed of said thermoplastic material and attached to said body, the volume enclosed by said handle being in fluid communication with the interior of said body through a channel found in said thermoplastic material and passing between said interior of said body and said volume, said volume being separated by said thermoplastic material from direct communication with the exterior of said container; and
(B) after molding said article, closing said channel between said interior of said body and said volume.

16. The method of claim 15 wherein the step of molding said article is accomplished by blow molding.

17. The product produced by the method of claim 16.

18. The method of claim 16 wherein, during the step of blow molding said article, air pressure is applied to said volume only through said interior of said body.

19. The method of claim 18 wherein said channel is closed by heating the thermoplastic material surrounding said channel.

20. The product produced by the method of claim 19.

21. The method of claim 19 wherein the step of heating said thermoplastic material is accomplished ultrasonically.

22. The method of claim 19 further including, prior to the step of molding said article, extruding a hollow parison and wherein said article is molded from said parison.

23. The method of claim 19 wherein said handle is integral with said body.

24. The method of claim 23 wherein said handle has an elongated shape.

25. The method of claim 22 wherein said handle has two attachments at separate locations to said body and is detached from said body between said locations.

26. The product produced by the method of claim 25.

27. The method of claim 25 wherein said neck is integral with said body.

28. The improvement of claim 25 wherein said thermoplastic material is polypropylene.

29. The method of claim 25 wherein each of said two attachments has a flat, curved configuration.

30. The product produced by the method of claim 29.

31. In a container composed of a thermoplastic material and including (a) a body with an opening in said body and (b) a neck coupled to said opening, the improvement comprising a hollow handle composed of thermoplastic material and attached to said body, the volume enclosed by said handle being separated from the interior of said body by a channel formed in said thermoplastic material and passing between said interior of said body and said volume, said channel being sealed closed, said volume having been in fluid communication with said interior prior to the sealing close of said channel.

32. The improvement of claim 31 wherein said handle is integral with said body.

33. The improvement of claim 32 where said handle has an elongated shape.

34. The improvement of claim 33 wherein said handle has two attachments at separate locations to said body and is detached from said body between said locations.

35. The improvement of claim 34 wherein said thermoplastic material is polypropylene.

36. The improvement of claim 34 wherein each of the said two attachments has a flat, curved configuration.

37. The improvement of claim 31 wherein said container is blow molded.

38. The improvement of claim 8 wherein said container is blow molded.

39. The improvement of claim 1 wherein said container is blow molded.

* * * * *